United States Patent [19]
Johnson et al.

[11] Patent Number: 5,798,073
[45] Date of Patent: Aug. 25, 1998

[54] MOLD ASSEMBLY FOR FORMING APERTURES IN A MOLDED BODY

[75] Inventors: Michael G. Johnson, Sussex; George Knoedl, Hunterdon; George J. Shevchuk, Old Bridge, all of N.J.

[73] Assignee: Lucent Technologies, Inc., Murray Hill, N.J.

[21] Appl. No.: 946,449

[22] Filed: Oct. 7, 1997

Related U.S. Application Data

[63] Continuation of Ser. No. 533,042, Sep. 25, 1995, abandoned.
[51] Int. Cl.⁶ .................. B29C 45/36; B29C 45/44
[52] U.S. Cl. .................. 264/313; 264/318; 264/328.1; 264/334; 249/64; 249/154; 425/468; 425/577
[58] Field of Search .................. 264/313, 318, 264/328.1, 334; 425/542, 577, 468; 249/63, 64, 150, 151, 154, 183

[56] References Cited

U.S. PATENT DOCUMENTS

| | | | |
|---|---|---|---|
| 2,341,499 | 2/1944 | Cunningham | 249/151 |
| 3,157,934 | 11/1964 | Williams | 249/183 |
| 3,704,194 | 11/1972 | Harrier | 249/183 |
| 3,893,220 | 7/1975 | Bittner | 264/334 |
| 4,248,823 | 2/1981 | Bader et al. | 249/64 |
| 4,420,297 | 12/1983 | Remon | 425/577 |
| 4,479,630 | 10/1984 | Wernecke . | |
| 4,552,716 | 11/1985 | Habich | 249/64 |
| 4,750,803 | 6/1988 | Schmidt . | |
| 4,861,534 | 8/1989 | Boehm et al. | 249/64 |
| 4,867,412 | 9/1989 | Greune | 249/151 |
| 5,167,898 | 12/1992 | Luther | 249/150 |
| 5,193,031 | 3/1993 | Baikrich . | |
| 5,211,524 | 5/1993 | Kilpelainen . | |
| 5,262,021 | 11/1993 | Lehmann et al. . | |
| 5,287,761 | 2/1994 | Fujii et al. . | |
| 5,298,208 | 3/1994 | Sibley et al. . | |
| 5,313,038 | 5/1994 | Kildea . | |
| 5,531,949 | 7/1996 | Heitfiled | 264/313 |

FOREIGN PATENT DOCUMENTS

| | | |
|---|---|---|
| 0349460A2 | 1/1990 | European Pat. Off. . |
| 0425933A2 | 5/1991 | European Pat. Off. . |
| 1558358 | 1/1969 | France . |
| 1209276 | 1/1966 | Germany . |
| 2453048 | 5/1976 | Germany . |

OTHER PUBLICATIONS

European Search Report, EP 9630 6756, Jan. 9, 1997.

*Primary Examiner*—Jill L. Heitbrink

[57] ABSTRACT

A mold assembly includes first and second housings having generally curved surfaces inside the mold cavity. The first housing has apertures extending therethrough. The second housing may have apertures, axially aligned with the apertures of the first housing, extending partially or completely therethrough. At least one guided, flexible, elongated rod member is configured for reception in the apertures of the first and second housings, the rod members being movable in a direction non-parallel to a direction of movement of the mold assembly with respect to the rod members. The mold assembly is particularly useful for forming a molded body having a plurality of apertures, aligned in arbitrary non-parallel directions relative to one another, extending therethrough.

19 Claims, 6 Drawing Sheets

MOLD ASSEMBLY FOR FORMING APERTURES IN A MOLDED BODY

This is a continuation of application Ser. No. 08/533,042 filed on Sep. 25, 1995, now abandoned.

BACKGROUND OF THE INVENTION

1. Field of the Invention

The present invention relates to a mold assembly and more particularly to a mold assembly for forming apertures in a molded body.

2. Description of the Related Art

The contour of a molded body traditionally has been determined by the shape of mold surfaces for receiving a molding substance. For instance, projections and notches located on surfaces of the mold leave a desired shape when a molding substance solidifies. However, there are constraints on the angles of the surfaces of such features relative to the direction in which the molded part is to be ejected from the mold without either preventing removal of the molded part from the mold or unnecessarily compounding the number of separable mold sections that must be opened.

Many electronic equipment require very small apertures in their design details. Furthermore, the angles of these apertures in relation to the surface of the molded body are significant factors from an engineering design perspective. For example, when providing a workpiece having a substantially hemispherical or curved surface with a plurality of apertures, it is often necessary that the apertures present the same size and shape where they pierce the surface. To achieve this, each of the apertures must be provided at an angle normal to that portion of the surface in which the aperture is being provided.

In the related art, fine diameter apertures have been formed in a molded part by running fine diameter, rigid rod members through the mold cavity. Typically, in such an arrangement, a plurality of rod members are affixed to one side of the mold. Alternatively, the rod members may be attached to a separately movable platen, advanced into the mold cavity after closing but before filling the mold, and then withdrawn after the molded part has solidified. However, a constraint with these arrangements is that since all rod members are rigid and are attached to a single section of the mold or to a single platen, all rod members and hence all apertures in the molded part must be parallel to one another. To achieve non-parallel apertures usually requires plural separable mold sections or plural movable platens.

Drilling a molded piece to provide the apertures is not efficient since, to ensure that all the apertures are normal to the surface and thus present the same size and shape, the holes would need to be drilled individually and the surface of the piece would need to be turned perpendicular to the drill bit each time an aperture is drilled. This would be a time consuming, hence costly process.

It has proven difficult to satisfy the aforesaid concerns because a mold assembly for forming a molded body having a plurality of apertures, aligned in arbitrary non-parallel directions relative to one another, extending therethrough has been difficult and time consuming to design, fabricate and operate.

SUMMARY OF THE INVENTION

The present invention relates to a mold assembly for the forming of a substantially hemispherical molded body with radially aligned apertures, the apertures each being provided generally normal to the surface of the hemispherical molded body. The present invention is particularly useful for providing a mold assembly for forming a molded body having a plurality of apertures, aligned in arbitrary non-parallel directions relative to one another, extending therethrough.

The mold assembly includes first and second housings. The first housing defines a generally convex surface having a plurality of apertures extending therethrough. The second housing defines a generally concave surface, also having a plurality of apertures extending therethrough, for reception of the convex portion of the first housing. The plurality of apertures defined on the convex portion of the first housing are positioned such that each respective aperture of the first housing is in axial alignment with a corresponding aperture of the second housing when the convex portion of the first housing is received in the concave portion of the second housing. A plurality of resilient elongated rod members, which are resilient to flexural deformation is laterally flexible, are configured for slidable reception through the apertures of the first housing and into the apertures of the second housing when the respective apertures are in axial alignment with one another.

The mold of the present invention preferably further includes a plurality of elongated tubular members having one end respectively disposed in each aforesaid aperture on the outside of the first housing (with the mold cavity considered to be the inside). Each elongated tubular member is configured to facilitate guidance of a respective elongated rod member through the axially aligned apertures of the first and second housings.

BRIEF DESCRIPTION OF THE DRAWINGS

So that one skilled in the art to which the subject invention appertains will better understand how to practice the present invention, preferred embodiments of the invention will be described in detail below with reference to the accompanying drawings, in which.

DETAILED DESCRIPTION OF THE PREFERRED EMBODIMENTS

Figure 1:
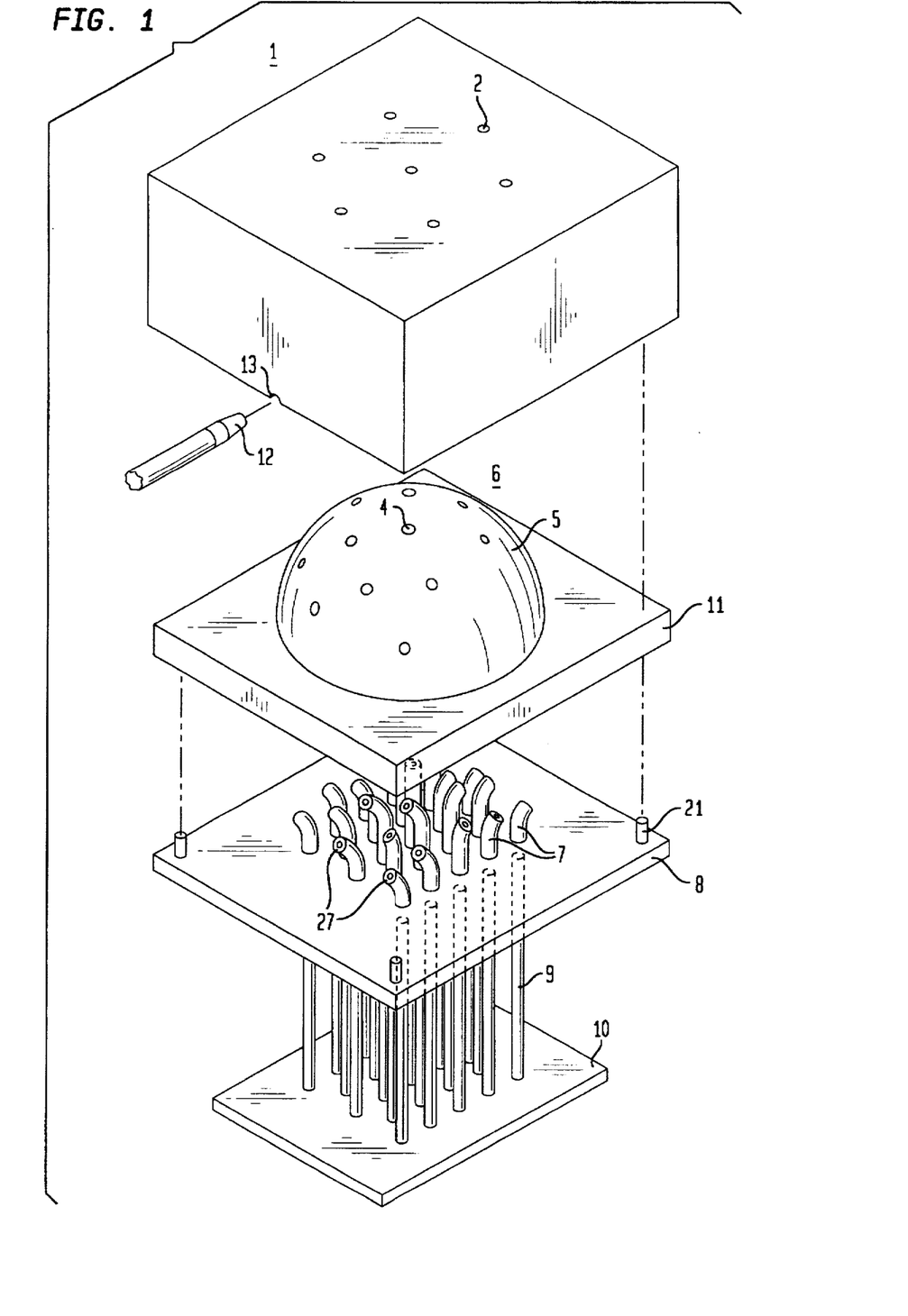
FIG. 1 illustrates an exploded isometric view of the mold assembly according to a first embodiment of the present invention.

Referring to the drawings in which like reference numerals identify similar or identical elements, FIG. 1 illustrates an exploded isometric view of the mold assembly according to a first embodiment of the present invention.

The mold itself consists essentially of an inner housing 6 and an outer housing 1. The two housings are brought into proximity with each other to provide a cavity 20 (FIG. 4) defining a shape of the work piece being formed.

Figure 2:
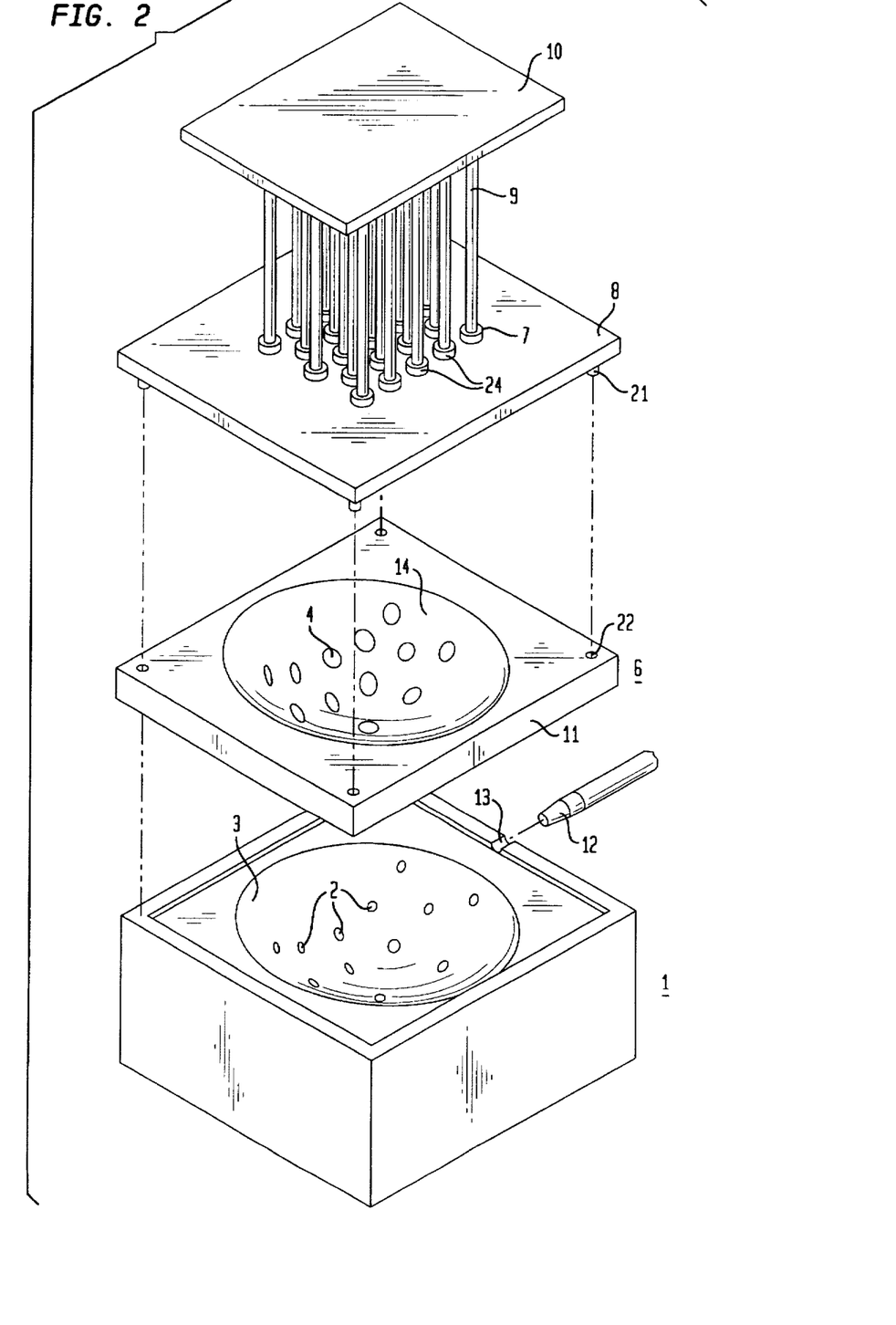
FIG. 2 illustrates another exploded isometric view of the mold assembly according to the first embodiment of the present invention.
Figure 3:
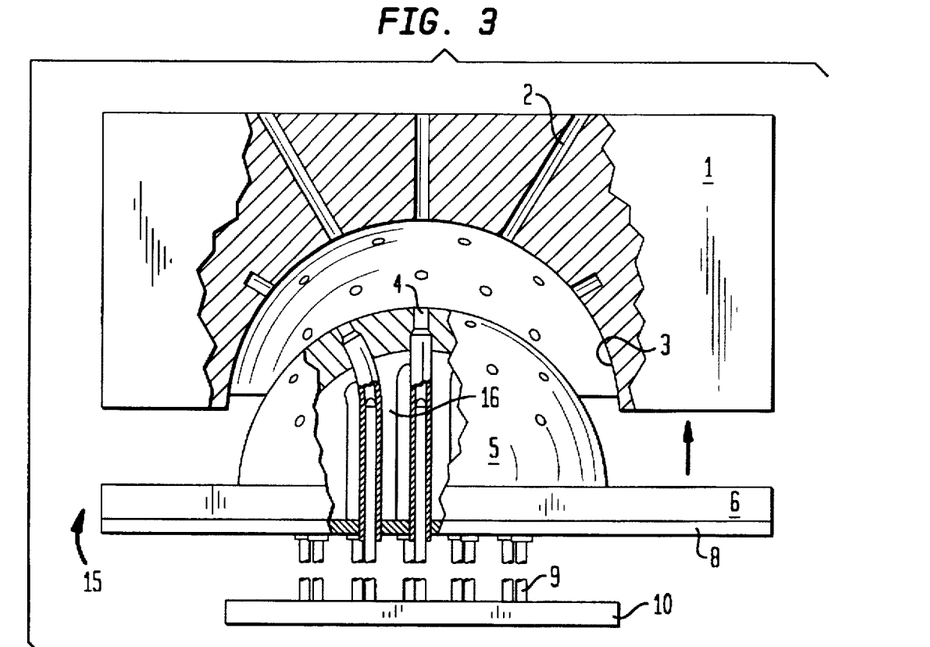
FIGS. 3–6 illustrate elevated partial cross-sectional views of the mold assembly according to the first embodiment of the present invention, during a molding operation.
Figure 9:
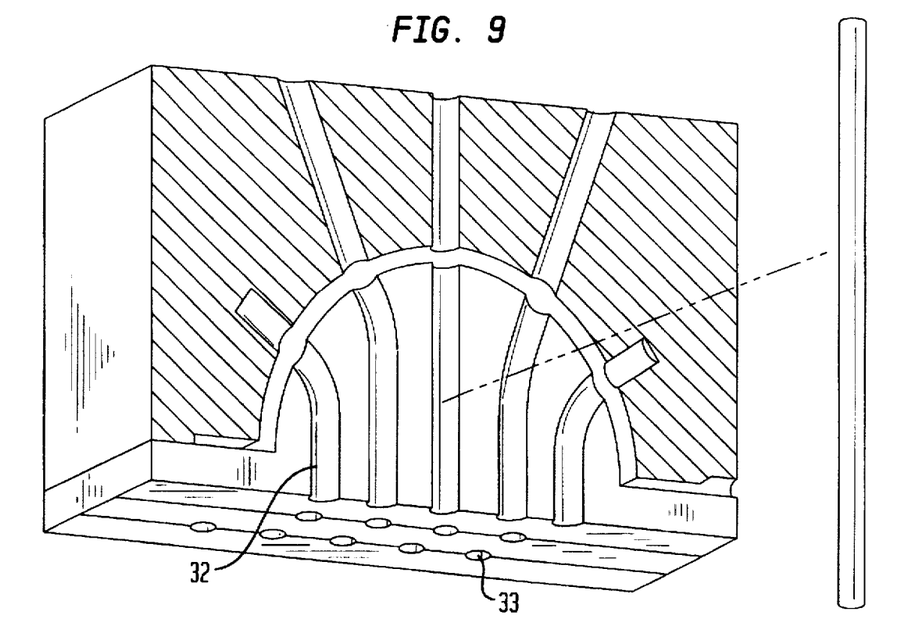
FIG. 9 illustrates a cross-sectional view of the mold assembly according to an embodiment of the present invention.

Outer housing 1 consists of a box-like structure having a substantially hemispherical concave surface portion 3 (FIG. 2). A plurality of apertures 2 are provided in outer housing 1 to give additional support to the distal ends of rod members 9. As seen in FIGS. 3 and 9, some of apertures 2 extend completely through outer housing 1 and some of apertures 2 extend only a portion of the way into housing 1. However, it is also feasible either to provide all or some of apertures 2 extending completely through outer housing 1, to provide all or some of apertures 2 extending only a portion of the way into housing 1, or to have no apertures in housing 1 at all.

As seen in FIG. 2, outer housing 1 includes a recessed surface portion 26 that forms a portion of a cavity defining the shape of the workpiece being formed.

Inner housing 6 consists of a plate member 11 having a convex surface portion 5 (FIG. 1). As shown in FIG. 2, the opposite side of plate member 11 also includes a concave surface portion 14. Apertures 4 extend through inner housing 6. As seen by comparison of FIGS. 1 and 2, the diameter of the apertures extending through inner housing 6 is larger on the mold outside (i.e., the concave surface portion 14 side) than on the mold inside (i.e., the convex surface portion 5 side). The reason for this difference will become apparent in the following description.

When outer housing 1 is brought into proximity with inner housing 6 so that concave surface portion 3 of outer housing 1 receives the convex surface portion 5 of inner housing 6, each aperture 2 of outer housing 1 is axially aligned with a corresponding aperture 4 of inner housing 6.

An injection nozzle 12 may be positioned for injecting a molding material through orifice 13 provided in outer housing 1 and into cavity 20 (FIG. 4) formed between the inner and outer housings. This configuration is known as parting-line injection. In the alternative, of course, it is possible to inject at a position near the middle of the cavity and to vent at the furthest and/or thinnest extremes.

Stabilizing plate 8 consists of a generally planar plate having a plurality of apertures 24 provided therein. Elongated hollow tube members 7 are fastened at one end in orifices 24. The elongated hollow tube members 7 are shaped for guiding elongated rod members 9.

Actuating rod platen 10 is provided with a plurality of elongated rod members 9 affixed at one end thereto. Elongated rod members 9 are resilient to flexural deformation i.e., laterally flexible and have a diameter slightly smaller than an inside diameter of elongated tube members 7 so that elongated rod members 9 can be reciprocally moved within elongated tube members 7.

As noted above, the diameter of apertures 4 provided in the side of inner housing 6 having concave surface portion 14 is slightly larger than the diameter of those apertures on the side having convex surface portion 5. The larger apertures are dimensioned to receive distal ends 27 of elongated tube members 7 (FIG. 1).

As shown in FIG. 3, prior to a molding operation, inner housing 6 and stabilizing plate 8 are brought together to form unit 15. Actuating rod platen 10, having elongated rod members 9, is brought into position and moved in a direction so that each elongated rod member 9 is pushed into a corresponding tube member 7. Elongated tube members 7 thus form guides for guiding elongated rod members 9.

Thus, when inner housing 6 and outer housing 1 are brought together, elongated tube members 7 can be utilized for guiding elongated rod members 9 through apertures 4 provided in inner housing 6, through mold cavity 20 (FIG. 5) and into apertures 2 provided in outer housing 1. Accordingly, elongated rod members 9 can be guided in a direction non-parallel to a direction of movement of the mold assembly with respect to the rod members. As shown in FIG. 2, inner housing plate 11 includes holes 22 for receiving alignment pins 21 provided on stabilizing plate 8, for aligning and mating inner housing 6 with stabilizing plate 8.

FIGS. 3–6 are sectional views illustrating the mold assembly during a molding operation.

Figure 4:
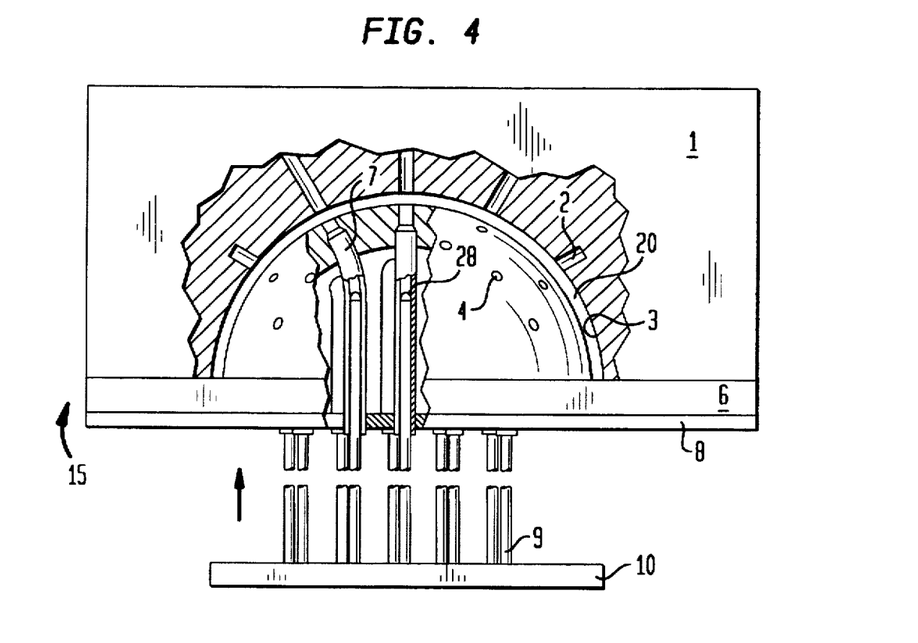

As seen in FIG. 4, when unit 15 is brought into contact with outer housing 1 to form enclosed mold cavity 20, each aperture 4 provided in inner housing 6 is axially aligned with a corresponding aperture 2 provided in outer housing 1. As shown, apertures 2 and 4 are provided generally perpendicular or normal to concave surface 3 and convex surface 5, respectively.

Figure 5:
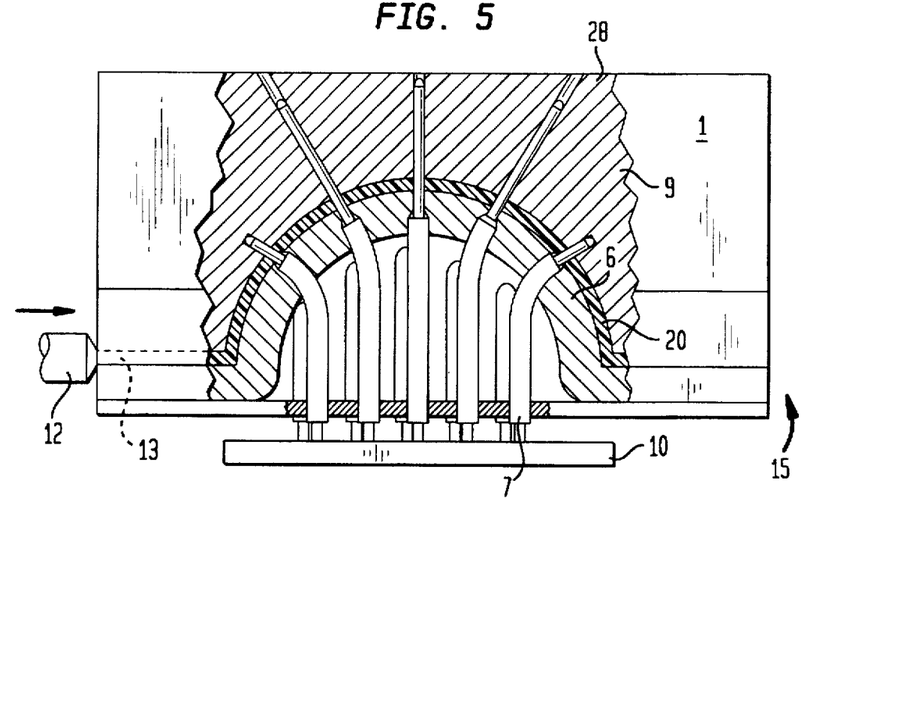

As shown in FIG. 5, actuating rod plate 10, attached to elongated rod members 9, is moved in a direction so that each elongated rod member 9, guided by a corresponding tube member 7, is pushed through a corresponding aperture 4, through the mold cavity 20, and into a corresponding aperture 2 in the outer mold housing 1.

Injection nozzle 12 is brought into proximity with orifice 13 and the molding substance (e.g., resin, plastic or rubber) is injected into cavity 20.

Figure 6:
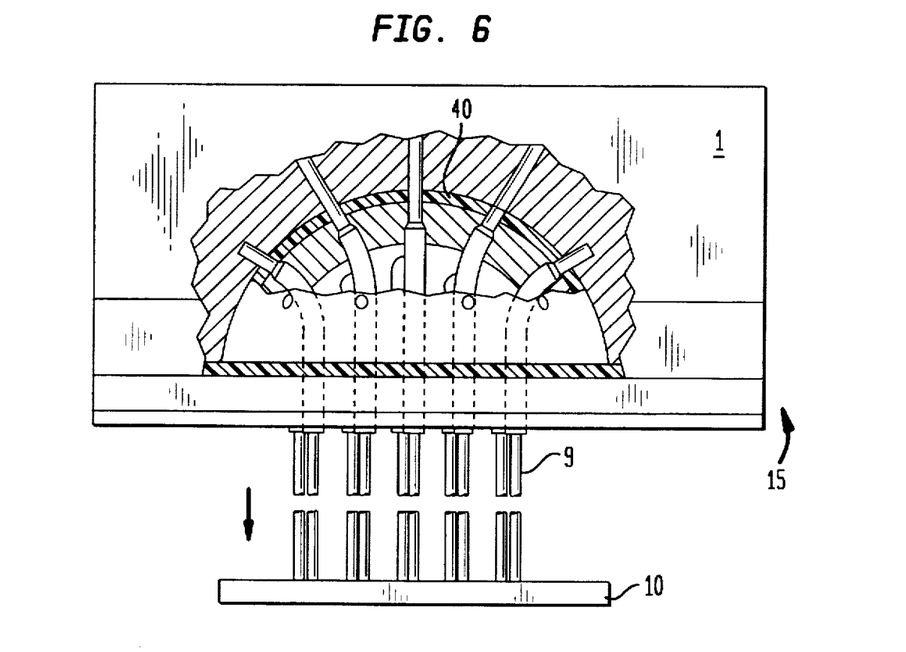

After the molding material solidifies, the elongated rod members 9 are retracted by downward movement of actuating rod plate 10, as shown in FIG. 6. The unit 15 and outer housing 1 are then separated and the molded piece 40 is removed from the mold.

Figure 10:
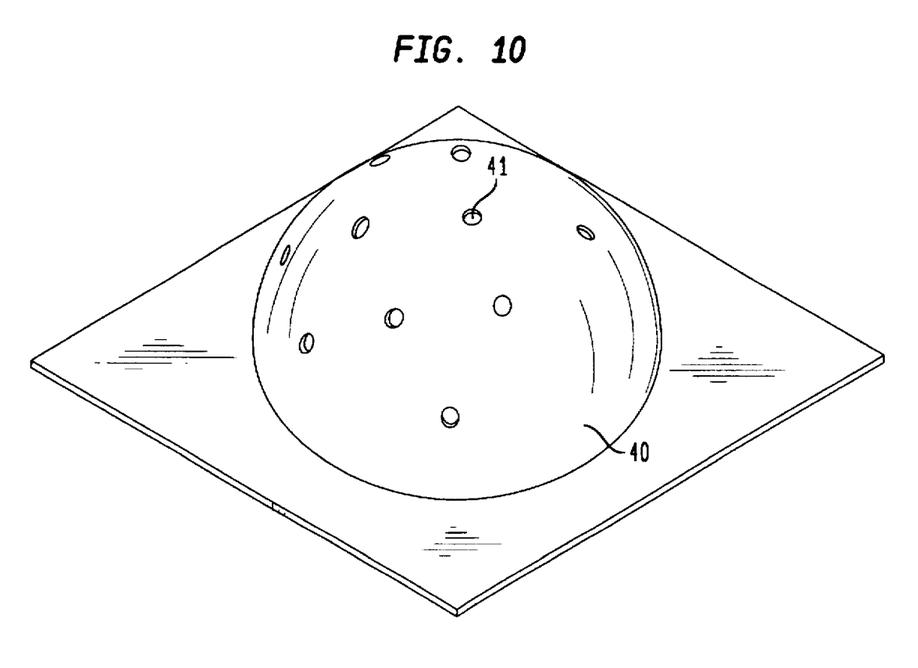
FIG. 10 illustrates an isometric view of a three-dimensional circuit board substrate manufactured using the mold assembly according to an embodiment of the present invention.

The molded piece 40, as depicted in FIG. 10, has multiple holes 41 extending therethrough. The holes are all perpendicular to the surface of the molded piece and present the same size and shape where they pierce its surface.

Although outer housing 1 is depicted with several of apertures 2, for receiving distal end portions 28 of elongated rod members 9, extending completely therethrough, as noted above the apertures need extend only a portion of the way into the outer housing 1 from concave surface 3, or need not extend into outer housing 1 at all.

Elongated tubular members 7 preferably have an inside diameter the same as the diameter of apertures 4 provided on convex surface side 5 of inner housing 6, and should preferably be slightly larger than the diameter of elongated rod members 9, so that the elongated rod members can be moved easily therein.

In addition, it may be preferable that the diameter of apertures 4 provided on convex surface side 5 of inner housing 6 not be much larger than the diameter of elongated rod members 9 as to form large gaps around the elongated rod members 9. For example, if actuating rod platen 10 is brought into the position depicted in FIG. 5 prior to the molding substance being injected, and if the clearance between rod members 9 and the inner diameter of apertures 4 is too large, an excessive amount of molding material injected into cavity 20 may enter the clearance gaps. Minimizing the clearance around elongated rod members 9 avoids or minimizes the amount of molding material that enters into the clearance gaps and thus reduces the likelihood of the molded part remaining locked into housing 6 and the amount of machining that has to be performed on the finished piece to remove the excess molding material.

Figure 7:
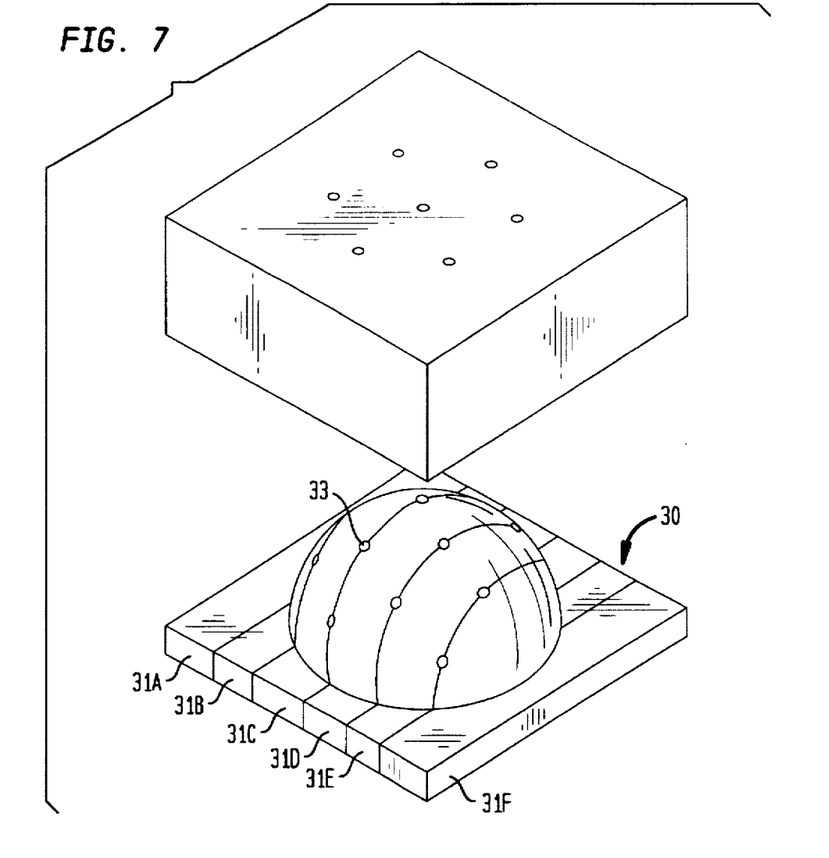
FIG. 7 illustrates an exploded isometric view of the mold assembly, according to another embodiment of the present invention.
Figure 8:
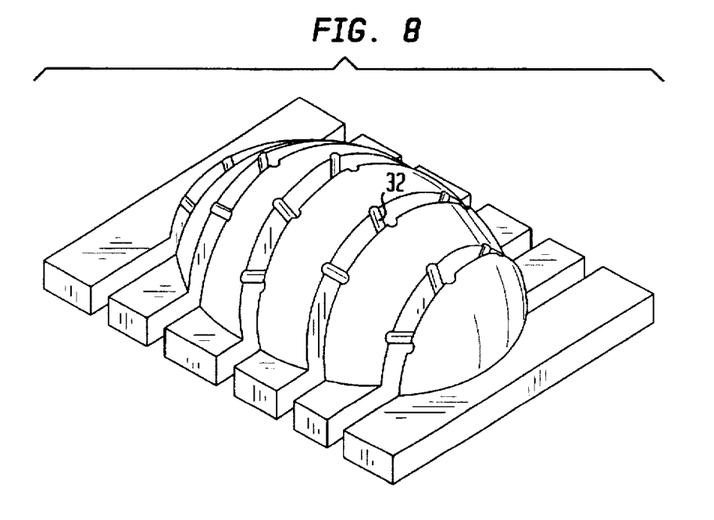
FIG. 8 illustrates a further exploded isometric view of an inner housing of the mold assembly according to an embodiment of the present invention.

FIGS. 7 and 8 illustrate a molding assembly according to another embodiment of the present invention. According to this embodiment, inner housing 30 consists of multiple layers or sub-sections 31A–31F which can be arranged together as a unit, as shown in FIG. 7, and can be separated out into individual sections, as shown in FIG. 8. Sections 31 can be secured together as a unit, either with one or more clamping members or they can be permanently secured together with a bonding material, for example.

As shown in FIG. 8, each piece 31 can include one or more grooves 32. Grooves 32 can be milled in pieces 31 with a ball end mill, for example. As shown, the confronting surfaces of each piece 31 are provided with corresponding grooves 32 so that when pieces 31 are placed together they form a plurality of channels extending therethrough.

This embodiment of the present invention aids in manufacturing of the mold assembly. For example, through-apertures on the order of 10–20 mils are difficult to tool, especially when acute bends (see FIG. 9) are necessary. However, relatively small grooves 32 are much easier to engrave and produce. In this embodiment of the present invention, these grooves serve the same function as elongated tube members 7 of the previously described embodiment.

As shown in FIG. 9, outer housing 1 can be identical to the first embodiment shown in FIGS. 1–6. Housing 1 can be manufactured relatively easily, even with relatively small apertures, since it is not necessary that acute bends be provided. However, it should be clear that outer housing 1 could also be formed by a plurality of individual pieces having grooves, the pieces being clamped or mounted together, as discussed above with respect to inner housing 30.

As shown in FIG. 10, the molded part has a hemispherical shaped surface 40 including a plurality of fine holes 41 provided normal to surface 40. As shown, all of the holes 41 present the same size and shape where they pierce the surface.

The present invention is thus useful for manufacturing three-dimensional parts requiring a plurality of fine features thereon. For example, holes 41 could be filled with a conductive material to form a plurality of fine conductors having the same diameter.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. A mold assembly for forming a molded body, said mold assembly comprising:

(a) a first housing having a first arbitrarily shaped surface and a plurality of apertures extending therethrough;

(b) a second housing having a second arbitrarily shaped surface positioned adjacent said first arbitrarily shaped surface of said first housing, said arbitrarily shaped surfaces of said first and second housings defining a mold cavity therebetween;

(c) a plurality of flexible elongated rod members configured to slide through said plurality of apertures of said first housing and at least partially through said mold cavity;

(d) an actuating member operatively associated with said plurality of elongated rod members, said actuating member being movable in a first direction to slide said plurality of rod members through said plurality of apertures; and (e) a plurality of guide members operatively associated with said first housing, said plurality of guide members configured to position said flexible elongated rod members to enter said mold cavity from said plurality of apertures in directions non-parallel to each other.

2. A mold assembly as recited in claim 1, wherein said first and second arbitrarily shaped surfaces include generally curved surfaces.

3. A mold assembly as recited in claim 1, wherein said first arbitrarily shaped surface is concave and said second arbitrarily shaped surface is convex.

4. A mold assembly as recited in claim 1, wherein each guide member includes an elongated tubular member having first and second ends, said first end being disposed in said one of said plurality of apertures of said first housing and configured to guide one of said elongated rod members therethrough.

5. A mold assembly as recited in claim 4, further comprising a stabilizing member operatively associated with said tubular members for stabilizing said tubular members.

6. A mold assembly as recited in claim 5, wherein said stabilizing member comprises a planar base member defining a plurality of apertures extending therethrough, wherein said second end of said plurality of tubular members is affixed within said plurality of apertures of said planar base member.

7. A mold assembly as recited in claim 5, wherein said actuating member is configured to effect reciprocating translation of said plurality of said flexible elongated rod members within said plurality of tubular members and said plurality of apertures of said first housing.

8. A mold assembly as recited in claim, 7 wherein said actuating member comprises a planar base member that is affixed to an end portion of said plurality of flexible elongated rod members.

9. A mold assembly as recited in claim 2, wherein each of said plurality of apertures of said first housing is formed substantially perpendicular to said generally curved surface of said first housing.

10. A mold assembly as recited in claim 1, further comprising injection means for providing a molding substance into said mold assembly when said second housing and said first housing are positioned to define said mold cavity.

11. A mold assembly as recited in claim 10, wherein said first housing includes an orifice through which said injection means can introduce the molding substance into said mold cavity.

12. A mold assembly as recited in claim 1, wherein said first housing comprises a plurality of layers, said plurality of layers including a plurality of corresponding grooves defining said plurality of apertures extending therethrough.

13. A mold assembly as recited as in claim 12, wherein each of said plurality of layers include at least one surface defining at least one generally half cylindrical surface forming one of said plurality of apertures extending through said first housing when said plurality of layers are placed together to form said first housing.

14. A mold assembly as recited in claim 1, wherein said second housing has at least one aperture extending at least a portion of the way therethrough, said plurality of apertures of said first housing being positioned in axial alignment with at least one corresponding aperture of said second housing when said second housing and said first housing are positioned to define said mold cavity, and wherein at least one of said plurality of flexible elongated rod members is configured for slidable reception through at least one of said plurality of apertures of said first housing, through said mold cavity and at least a portion of the way into said at least one corresponding aperture provided in said second housing when said apertures are in axial alignment with one another.

15. A mold assembly as recited in claim 14 wherein said at least one aperture in said second housing extends completely through said second housing.

16. A method of molding a generally curved molded body, said method comprising steps of:

(a) providing a first housing and a second housing to form a mold assembly having a mold cavity, the first housing defining a first arbitrarily shaped surface including a plurality of apertures extending therethrough and having a plurality of guide members associated therewith and the second housing defining a second arbitrarily shaped surface configured for reception with the first housing, said first and second housings being positioned to define the mold cavity;

(b) inserting a plurality of flexible, elongated rod members into the plurality of apertures of the first housing using a single actuating member, each of the flexible, elongated rod members being directed by a respective guide member to enter the mold cavity from one of said plurality of apertures in a direction non-parallel to another of said elongated rod members;

(c) injecting a molding substance into the mold cavity;

(d) withdrawing the plurality of elongated rod members from the plurality of apertures of the first housing;

(e) separating the first and second housings; and (f) ejecting the molded body from the mold cavity.

17. The method as recited in claim 16, wherein said step of providing the first housing and the second housing comprises positioning a plurality of layers together to form the first housing, with each of the plurality of layers defining at least one generally half cylindrical surface so as to form at least one of the plurality of apertures through the first housing when the plurality of layers are placed together to form the first housing.

18. The method as recited in claim 16, wherein the respective guide members each include respective elongated tubular guiding member having first and second ends and said step of inserting the plurality of flexible, elongated rod members comprises sliding the plurality of flexible elongated rod members through said respective elongated tubular guiding members, each first end of each of the elongated tubular guiding members being disposed in one of the plurality of apertures provided in the first housing.

19. The method as recited in claim 16, wherein said step of inserting the plurality of flexible, elongated rod members comprises moving the actuating member, which is operatively associated with the plurality of flexible, elongated rod members, so as to reciprocally move the plurality of flexible, elongated rod members relative to the plurality of apertures of said first housing.

* * * * *